(12) United States Patent
Hyun et al.

(10) Patent No.: US 11,469,599 B2
(45) Date of Patent: Oct. 11, 2022

(54) METHOD FOR CONTROLLING CHARGING OF BATTERY OF ELECTRONIC DEVICE AND ELECTRONIC DEVICE THEREOF

(71) Applicant: Samsung Electronics Co., Ltd., Gyeonggi-do (KR)

(72) Inventors: Yonghwan Hyun, Gyeonggi-do (KR); Kyonghwan Cho, Gyeonggi-do (KR); Sengtai Lee, Gyeonggi-do (KR)

(73) Assignee: Samsung Electronics CO., LTD., Suwon-si (KR)

( * ) Notice: Subject to any disclaimer, the term of this patent is extended or adjusted under 35 U.S.C. 154(b) by 114 days.

(21) Appl. No.: 17/063,773

(22) Filed: Oct. 6, 2020

(65) Prior Publication Data
US 2021/0111571 A1  Apr. 15, 2021

(30) Foreign Application Priority Data
Oct. 10, 2019 (KR) .................. 10-2019-0125119

(51) Int. Cl.
*H02J 7/00* (2006.01)
*H04W 4/80* (2018.01)
*H04B 17/318* (2015.01)

(52) U.S. Cl.
CPC .......... *H02J 7/00034* (2020.01); *H02J 7/007* (2013.01); *H02J 7/007188* (2020.01); *H04B 17/318* (2015.01); *H04W 4/80* (2018.02)

(58) Field of Classification Search
CPC .. H02J 7/007; H02J 7/007188; H02J 7/00034; H04B 17/318; H04W 4/80
USPC .......................... 320/107, 114, 125, 162, 163
See application file for complete search history.

(56) References Cited

U.S. PATENT DOCUMENTS

| | | |
|---|---|---|
| 8,565,729 B2 | 10/2013 | Moseler et al. |
| 9,819,205 B2 | 11/2017 | Horii |
| 10,014,705 B2 | 7/2018 | Baratzadeh et al. |
| 10,439,412 B2 | 10/2019 | Guo et al. |
| 10,536,021 B2 | 1/2020 | Jung et al. |
| 2009/0191925 A1 | 7/2009 | Moseler et al. |
| 2016/0295427 A1 | 10/2016 | Baratzadeh et al. |

(Continued)

FOREIGN PATENT DOCUMENTS

| | | |
|---|---|---|
| KR | 10-2017-0049500 A | 5/2017 |
| KR | 10-2017-0134090 A | 12/2017 |

(Continued)

OTHER PUBLICATIONS

International Search Report dated Jan. 15, 2021.

*Primary Examiner* — Edward Tso
*Assistant Examiner* — Aaron Piggush
(74) *Attorney, Agent, or Firm* — Cha & Reiter, LLC (57) ABSTRACT

An electronic device and method are disclosed. The electronic device includes a radio signal receiving circuit configured to receive a radio signal, a battery, a charging circuit, and a processor. The processor implements the method, including determining a communication quality of the radio signal when the radio signal is received through the radio signal receiving circuit, while the charging circuit is charging the battery, selecting a charging method and set a charging current of the charging circuit for the battery, based on the determined communication quality, and controlling the charging circuit to charge the battery using the selected charging method and the set charging current.

10 Claims, 9 Drawing Sheets

(56) References Cited

U.S. PATENT DOCUMENTS

| | | | | |
|---|---|---|---|---|
| 2017/0033581 A1* | 2/2017 | Horii | ................ | H02J 50/10 |
| 2017/0220189 A1 | 8/2017 | Guo et al. | | |
| 2017/0294790 A1 | 10/2017 | Tian et al. | | |
| 2017/0346306 A1* | 11/2017 | Jung | ................ | H02J 7/007188 |
| 2018/0102667 A1* | 4/2018 | Choi | ................ | H04B 5/0037 |

FOREIGN PATENT DOCUMENTS

| | | |
|---|---|---|
| KR | 10-2018-0039521 A | 4/2018 |
| KR | 10-2019-0000214 A | 1/2019 |

\* cited by examiner

| RSSI | CHARGING METHOD | CHARGING CURRENT |
|---|---|---|
| −65 dBm | DIRECT CHARGING | 4A |
| −70 dBm | DIRECT CHARGING | 2A |
| −75 dBm | 9V QUICK CHARGING | 1.67A |
| −80 dBm | 9V QUICK CHARGING | 0.7A |
| −85 dBm | 5V QUICK CHARGING | 1.8A |
| −90 dBm | 5V QUICK CHARGING | 1.2A |

METHOD FOR CONTROLLING CHARGING OF BATTERY OF ELECTRONIC DEVICE AND ELECTRONIC DEVICE THEREOF

CROSS-REFERENCE TO RELATED APPLICATION(S)

This application is based on and claims priority under 35 U.S.C. § 119 to Korean Patent Application No. 10-2019-0125119, filed on Oct. 10, 2019, in the Korean Intellectual Property Office, the disclosure of which is incorporated by reference herein its entirety.

BACKGROUND

1. Field

Embodiments disclosed herein relate to charging a battery in an electronic device, and more particularly, to controlling charging of the battery to reduce interference with data transmission/reception.

2. Description of Related Art

Electronic devices have become increasing sophisticated, diverse and popular with consumers. They have also become increasingly miniaturized, resulting in a variety of small-scale, hand-held or body-worn devices. One example of these devices is an external battery, which includes charging circuits to control charging of other devices connected to the external battery.

Battery charging has also become more sophisticated, and now include high voltage charging which can reduce charging time.

The above information is presented as background information only to assist with an understanding of the disclosure. No determination has been made, and no assertion is made, as to whether any of the above might be applicable as prior art with regard to the disclosure.

SUMMARY

Some portable electronic devices include communication circuitry to allow communication with external devices. However, in the case of small devices, a power pathway for battery charging may be located near to a pathway for communication-related electrical signals. As a result, when the battery is being charged high voltage and/or high current charging methods, noise may be introduced into the communication signal for communication from the charging current.

Aspects of the disclosure are to address at least the above-mentioned problems and/or disadvantages and to provide at least the advantages described below. Accordingly, an aspect of the disclosure is to provide In accordance with an aspect of the disclosure, an electronic device may include a radio signal receiving circuit configured to receive a radio signal, a battery, a charging circuit configured to charge the battery, a memory, a processor communicatively connected to the radio signal receiving circuit, the charging circuit, and the memory, wherein the memory stores instructions that, when executed, cause the processor to determine a communication quality of the radio signal when the radio signal is received through the radio signal receiving circuit, while the charging circuit is charging the battery, select a charging method and set a charging current of the charging circuit for the battery, based on the determined communication quality, and control the charging circuit to charge the battery using the selected charging method and the set charging current.

In accordance with another aspect of the disclosure, a method for charging a battery may include initiating charging of the battery using a charging circuit, receiving, through a radio signal receiving circuit, a radio signal while the battery is being charged, determining, by at least one processor, a communication quality of the received radio signal, selecting a charging method and setting a charging current of the charging circuit for the battery based on the determined communication quality, and controlling the charging circuit to charge the battery using the selected charging method and the set charging current.

In accordance with another aspect of the disclosure, a recording medium may store a program executing a process including starting charging the battery using a charging circuit, receiving a radio signal while the battery is being charged, determining a communication quality of the radio signal, allowing the charging circuit to determine a charging method and a charging current for battery charging based on the communication quality, and allowing the charging circuit to charge the battery based on the charging method and the charging current.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the description of the drawings, the same or similar reference numerals may be used for the same or similar components.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
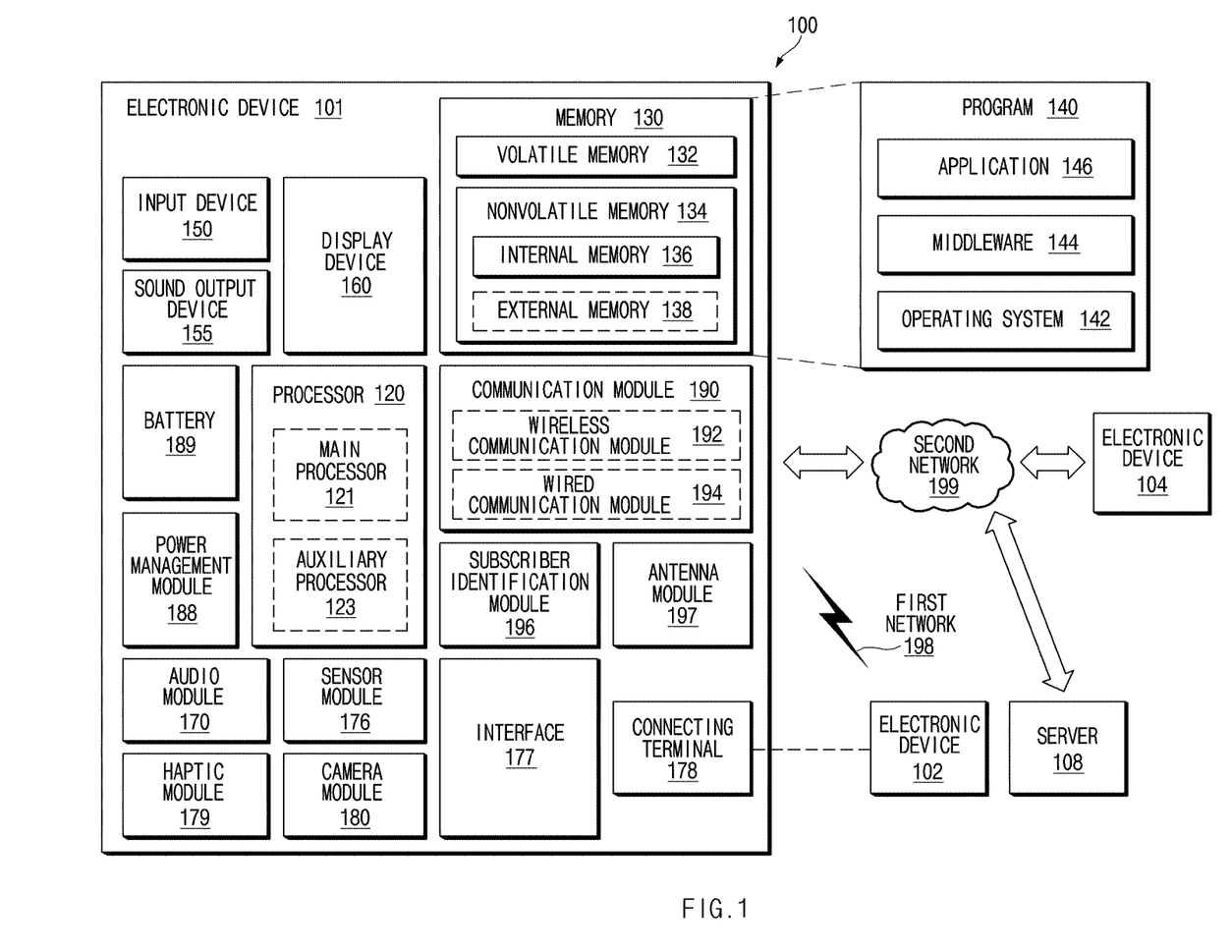
FIG. 1 is a block diagram of an electronic device in a network environment, according to certain embodiments.

FIG. 1 is a block diagram of an electronic device in a network environment according to certain embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
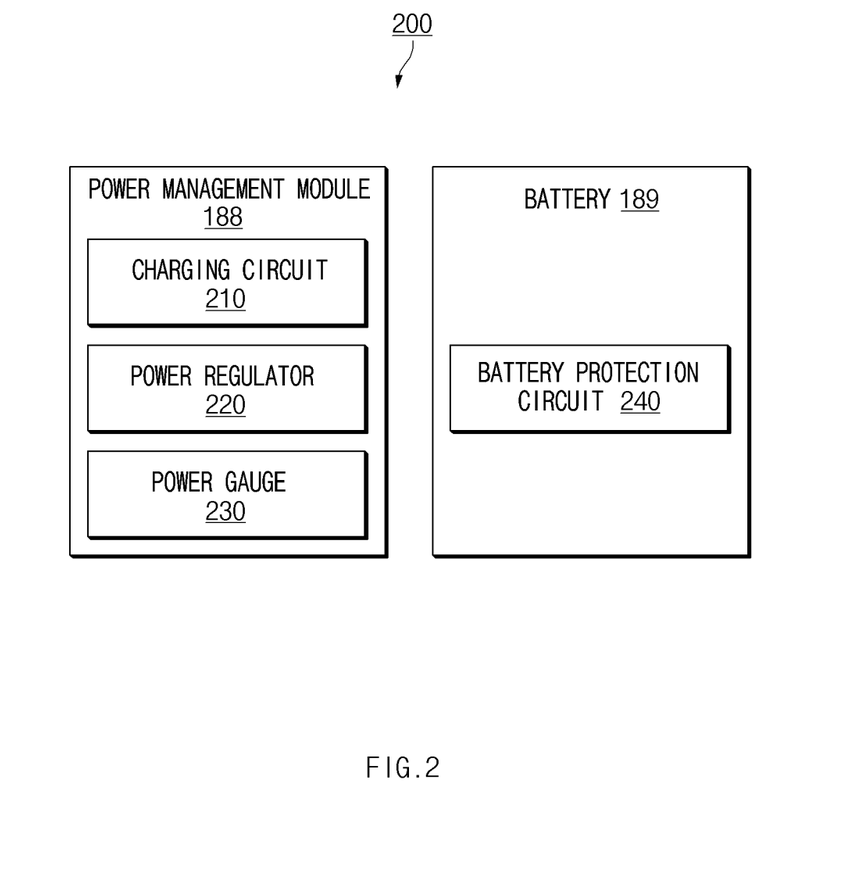
FIG. 2 is a block diagram of a power management module and a battery, according to certain embodiments.

FIG. 2 is a block diagram 200 of a power management module 188 and a battery 189 according to certain embodiments. Referring to FIG. 2, the power management module 188 may include a charging circuit 210, a power regulator 220, or a power gauge 230. The charging circuit 210 may charge the battery 189 by using power supplied from an external power source for the electronic device 101. According to an embodiment, the charging circuit 210 may select a charging method (e.g., a normal charging method or a quick charging method) and charge the battery 189 using the selected charging method based on at least some of a type of an external power source (e.g., power adapter, USB or wireless charging), the amount of power (e.g., about 20 watts or more) which is able to be supplied from the external power source, or a type of the battery 189. The external power source may be connected to the electronic device 101, for example, through a connection terminal 178 in a wired manner, or may be connected through the antenna module 197 in a wireless manner.

The power regulator 220 may generate a plurality of powers having different voltage levels or different current levels by adjusting, for example, a voltage level or current level of power supplied from, for example, the external power source or the battery 189. The power regulator 220 may adjust the power of the external power source or the battery 189 to a voltage or current level suitable to each of some of components included in the electronic device 101. According to an embodiment, the power regulator 220 may be implemented in the form of a low drop out (LDO) regulator or a switching regulator. The power gauge 230 may measure usage state information about the battery 189 (e.g., capacity of the battery 189, the number of times of charging and discharging, voltage, or temperature).

The power management module 188 may determine charge state information related to charging of the battery 189 (e.g., life, overvoltage, low voltage, overcurrent, overcharge, over discharge, overheat, short circuit, or swelling) based at least in part on the measured usage state information by using, for example, the charging circuit 210, the power regulator 220, or the power gauge 230. The power management module 188 may determine whether the battery 189 is normal or abnormal based at least in part on the determined charge state information. When it is determined that the state of the battery 189 is abnormal, the power management module 188 may adjust charging of the battery 189 (e.g., decrease charging current or voltage, or stop charging). According to an embodiment, at least some of functions of the power management module 188 may be performed by an external control device (e.g., the processor 120).

The battery 189 may include a battery protection circuit module (PCM) 240 according to an embodiment. The battery protection circuit module 240 may perform one or more of various functions (e.g., a pre-blocking function) for preventing performance degradation or burnout of the battery 189. The battery protection circuit module 240 may be additionally or alternatively configured as a part of a battery management system (BMS) capable of performing various functions including cell balancing, battery capacity measurement, charging/discharging frequency measurement, temperature measurement, or voltage measurement.

According to an embodiment, at least a part of the usage state information or the charge state information of the battery 189 may be measured using a relevant sensor (for example, a temperature sensor) of the sensor modules 176, the power gauge 230, or the power management module 188. According to an embodiment, the relevant sensor (e.g., a temperature sensor) of the sensor module 176 may be included as a part of the battery protection circuit module 240, or may be disposed near the battery 189, as a separate device.

Figure 3:
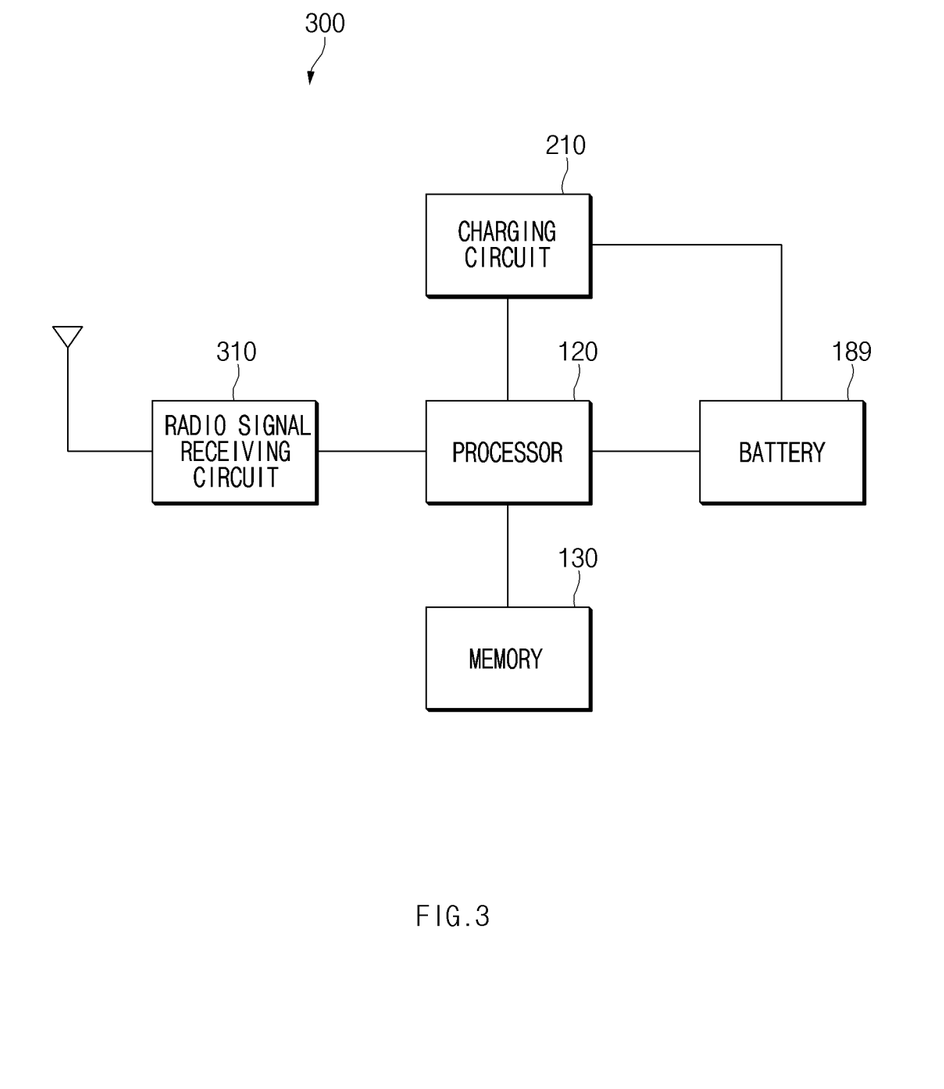
FIG. 3 is a block diagram illustrating components of an electronic device according to an embodiment.

FIG. 3 is a block diagram 300 illustrating components of an electronic device (e.g., the electronic device 101 of FIG. 1) according to an embodiment.

According to an embodiment, an electronic device may include the processor 120 (e.g., the processor 120 of FIG. 1), the memory 130 (e.g., the memory 130 of FIG. 1), a radio signal receiving circuit 310 (e.g., the communication module 190 of FIG. 1), a charging circuit 210 (e.g., the charging circuit 210 of FIG. 2), and the battery 189 (e.g., the battery 189 of FIG. 1 or the battery 189 of FIG. 2).

According to an embodiment, the memory 130 may store instructions that may be executed by the processor 120. The processor 120 may process data or control components of the electronic device by executing the instructions stored in the memory 130. Operation of the electronic device described herein may be understood as being performed when the processor 120 executes the instructions stored in the memory 130.

According to an embodiment, the battery 189 may store power and supply power for operation of the components of the electronic device. The charging circuit 210 may charge the battery 189, which may be under the control of the processor 120. For example, the processor 120 may cause the charging circuit 210 to charge the battery 189 using a charging method and/or charging power determined by the processor 120. The charging method may include, for example, a direct charging method, a quick charging method, or a normal charging method. The direct charging method may refer to a method in which an external charger directly supplies charging power to the battery 189 to charge the battery 189 when power of the external charger is directly electrically connected to a power input/output terminal of the battery 189. The quick charging method may refer to a method of rapidly charging the battery 189 with an "excessive" current. For example, the quick charging method may mean a method for charging the battery 189 with a current of 50% of the capacity of the battery 189. For example, a 9V quick charger may be used to perform charging based on the quick charging method. The normal charging method may mean a method for charging the battery 189 with a normal current and/or voltage. For example, a 5V normal charger may be used to perform charging based on the normal charging method.

The radio signal receiving circuit 310 may obtain data from a received radio signal (radio frequency signal). For example, the radio signal receiving circuit 310 may obtain data for video streaming from the received radio signal. A component (e.g., antenna radiator) for obtaining a radio signal of the radio signal receiving circuit 310 or a component for transferring a radio signal are located adjacent to a path through which power is transferred from an external charging device to the battery 189 through the charging circuit 210, the quality of the received radio signal may be degraded due to a charging noise. In particular, as the power transferred to the battery 189 increases, a noise level affecting the radio signal may increase. For example, when the processor 120 performs a video streaming service while supplying high power to quickly charge the battery 189, the video streaming may be interrupted or the quality of the video being played may be degraded due to degradation in the quality of the radio signal received through the radio signal receiving circuit 310.

Figure 4:
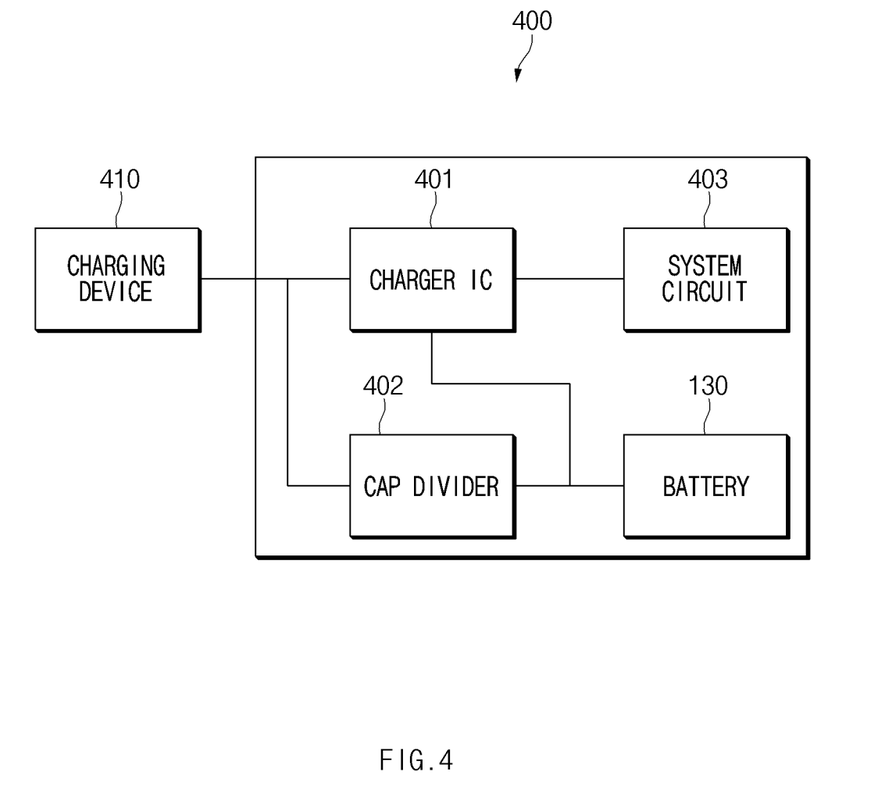
FIG. 4 is a block diagram for describing a configuration of a charging circuit according to an embodiment.

FIG. 4 is a block diagram 400 for describing a configuration of a charging circuit (e.g., the charging circuit 210 of FIG. 2 and the charging circuit 210 of FIG. 3) according to an embodiment. In particular, FIG. 4 relates to an embodiment of a charging circuit capable of performing charging based on a direct charging method.

A charging circuit according to an embodiment may include a charger integrated circuit (IC) 401 and a cap divider 402. To perform direct charging, an electronic device according to an embodiment may supply a charging current from a charging device 410 to a battery 189 through the circuit of the cap divider 402. The electronic device may supply power for operation of the electronic device from the battery 189 to a system circuit 403 while charging the battery 189. The system circuit 403 may include components of the electronic device (e.g., the processor 120 of FIG. 1) for enabling operation of the electronic device.

According to another embodiment, the electronic device may supply power to the system circuit 403 through the charger IC 401 while charging the battery.

Figure 5:
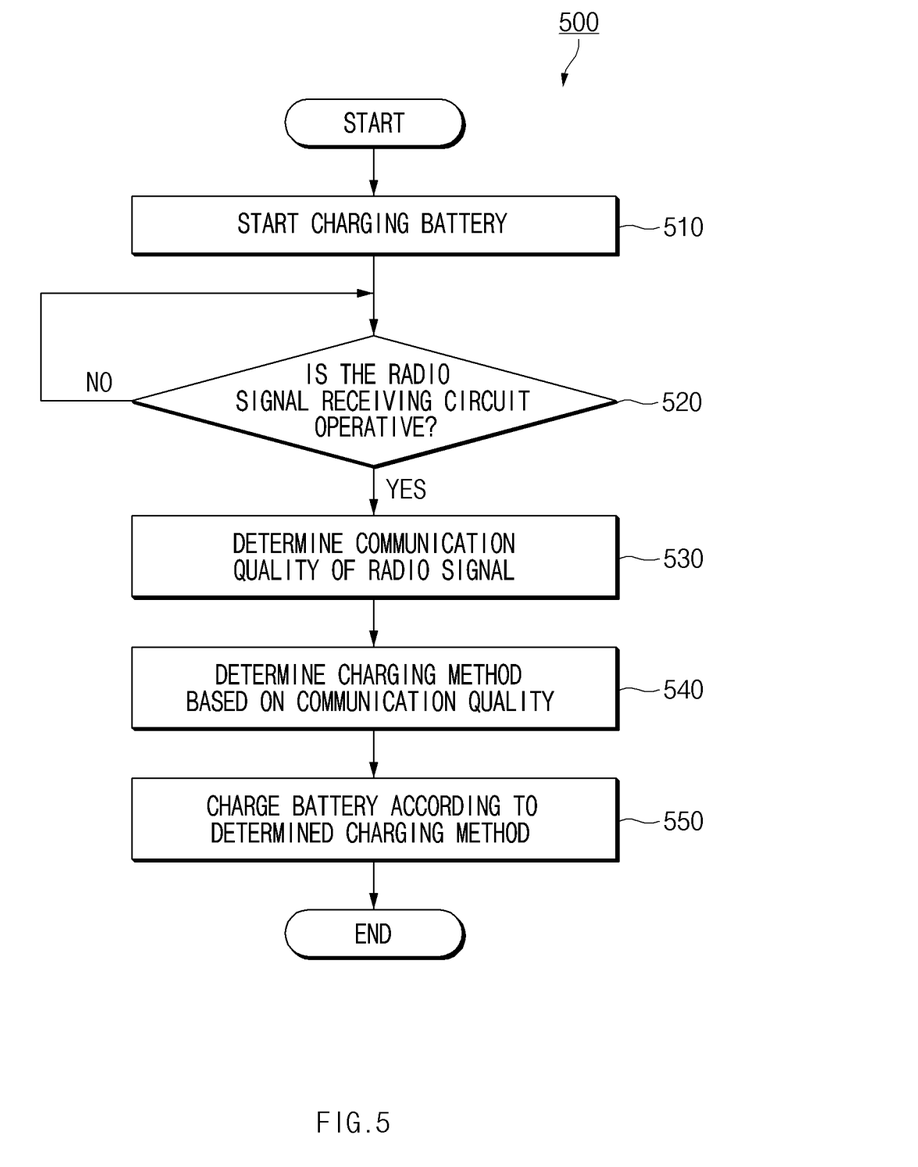
FIG. 5 is a flowchart of a process of charging a battery in an electronic device according to an embodiment.

FIG. 5 is a flowchart 500 of a process of charging a battery (e.g., the battery 189 of FIG. 1 or the battery 189 of FIG. 3) in an electronic device (e.g., the electronic device 101 of FIG. 1), according to an embodiment.

In operation 510, when charging power is supplied to an electronic device from an external charging device, the electronic device may start charging a battery. The electronic device according to an embodiment may identify a type of the external charging device and start charging the battery based on a charging method according to the type of the external charging device in operation 510. For example, the electronic device may receive an identifier for identifying the external charging device from the external charging device, and identify the external charging device based on the received identifier. When the external charging device is able to provide power for direct charging, the electronic device may charge the battery based on the direct charging method in operation 510. For another example, the electronic device may identify the type of the external charging device based on a voltage and/or current supplied from the external charging device. However, embodiments are not limited thereto.

In operation 520, the electronic device may determine whether a radio signal receiving circuit (e.g., the radio signal receiving circuit 310 of FIG. 3) is under operation, while charging the battery. That is, the electronic device may determine whether an operation of receiving a radio signal is performed through the radio signal receiving circuit during battery charging. When the radio signal receiving circuit is inoperative, the electronic device may continue to charge the battery based on the charging method disclosed in operation 510.

When the radio signal receiving circuit is operative while the battery is being charged, the electronic device may determine a communication quality of the radio signal received through the radio signal receiving circuit in operation 530. The communication quality may include at least one of a radio signal reception sensitivity or a received signal strength value. The radio signal reception sensitivity may include, for example, a strength of a received signal capable of maintaining a bit error rate (BER) that is less than or equal to a threshold level. The received signal strength value may include at least one of, for example, a Received Signal Strength Indicator (RSSI), a Reference Signal Received Power (RSRP), a Reference Signal Received Quality (RSRQ), and a Signal to Interference plus Noise Ratio (SINR).

In operation 540, the electronic device may determine a charging method to be applied for battery charging based on the determined communication quality. According to an embodiment, although the electronic device starts charging the battery based on a first charging method in operation 510, the electronic device may change a charging method for charging of the battery from the first charging method to a second charging method when the communication quality determined in operation 530 falls out of a specified range (e.g., a predetermined or prespecified range). The specified range may be a value stored in a memory (e.g., the memory 130 of FIG. 1) of the electronic device as a condition (operation condition) for normal operation of the radio signal receiving circuit. For example, when the BER determined in operation 530 is less than a maximum BER stored in the electronic device, the electronic device may change the charging method for charging of the battery as it permits continued communication without introducing excessive communication noise or error. In operation 550, the electronic device may charge the battery using the determined charging method.

Figure 6:
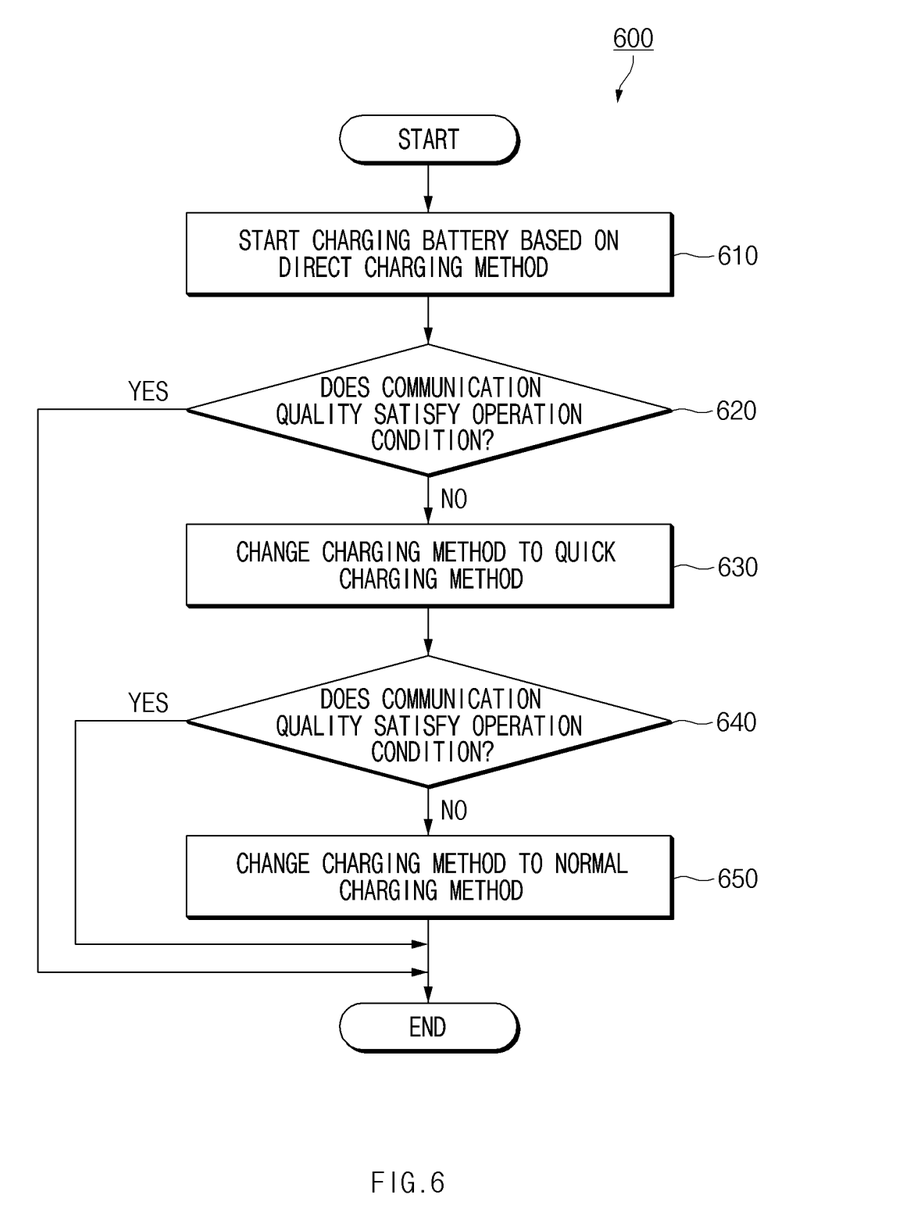
FIG. 6 is a flowchart of a process of determining a charging method in an electronic device, according to an embodiment.

FIG. 6 is a flowchart 600 of a process of determining a charging method in an electronic device (e.g., the electronic device 101 of FIG. 1) according to an embodiment. In particular, FIG. 6 relates to an embodiment in which an electronic device determines a charging method while an external charging device is connected for direct charging.

In operation 610, when charging power is supplied to an electronic device from an external charging device (a direct charger), the electronic device may initiate charging of the battery based on a direct charging method.

When a radio signal is received through a radio signal receiving circuit (e.g., the radio signal receiving circuit 310 in FIG. 3) while the battery is being charged based on the direct charging method, the electronic device may perform operation 620, by determining whether a communication quality satisfies an operational condition. When the communication quality satisfies the operational condition, the electronic device may continuously charge the battery based on the direct charging method.

When the communication quality of the radio signal does not satisfy the operation condition, that is, when the communication quality value is out of a specified range (e.g., insufficient RSSI, excessive error rate, excessive signal noise, etc.) the electronic device may change the charging method to a quick charging method in operation 630.

The electronic device may perform operation 640, including re-determining whether a communication quality of a radio signal received while charging the battery based on the quick charging method satisfies an operational condition. When the communication quality satisfies the operation condition, the electronic device may continuously charge the battery based on the quick charging method.

When the communication quality of the radio signal does not satisfy the operation condition, that is, when the communication quality value is out of the specified range, the electronic device may change the charging method from the quick charging method, to charging the battery based on a normal charging method in operation 650.

Figure 7:
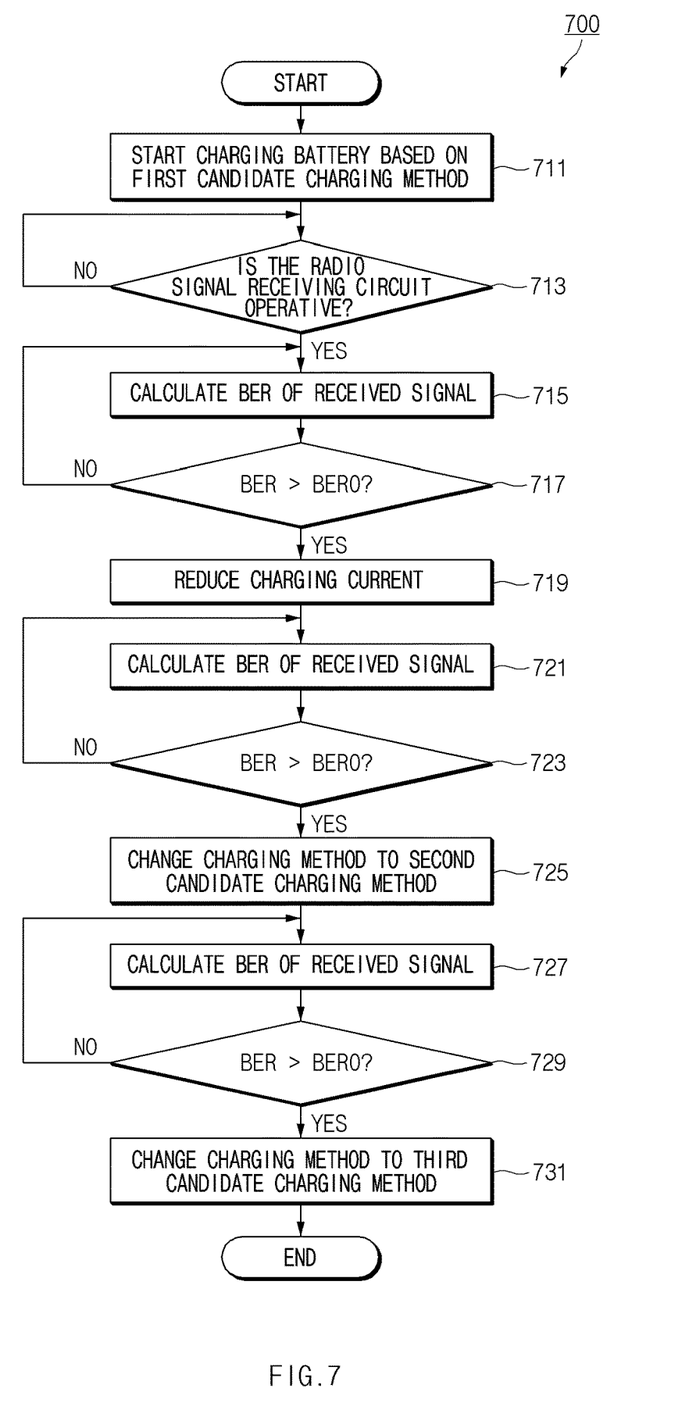
FIG. 7 is a flowchart of a process of determining a charging method in an electronic device according to an embodiment.

FIG. 7 is a flowchart 700 of a process of determining a charging method in an electronic device (e.g., the electronic device 101 of FIG. 1) according to an embodiment.

When charging power for battery charging is supplied, in operation 711, the electronic device may start charging the battery based on a first candidate charging method (e.g., direct charging method) among charging methods applicable by the electronic device in operation 711.

In operation 713, the electronic device may determine whether a radio signal receiving circuit (e.g., the radio signal receiving circuit 310 of FIG. 3) is operative while charging the battery. That is, the electronic device may determine whether there is a radio signal received through a radio signal receiving circuit. When the radio signal receiving circuit is inoperative, the electronic device may continuously charge the battery based on the first candidate charging method.

When the radio signal receiving circuit is operative while the battery is being charged, in operation 715, the electronic device may calculate a BER (bit error rate) of the received radio signal. In operation 717, the electronic device may determine whether the calculated BER is greater than the maximum BER (BER0).

When the calculated BER is less than or equal to the maximum BER, the electronic device may monitor the BER of a radio signal received while repeatedly performing operation 715. When the calculated BER is greater than the maximum BER, the electronic device may reduce a charging current supplied for battery charging in operation 719. For example, the electronic device may reduce the charging current supplied to a charging circuit for battery charging by 200 mA.

In operation 721, the electronic device may calculate the BER of a radio signal received while charging the battery, based on the reduced charging current. In operation 723, the electronic device may determine whether the calculated BER is greater than the maximum BER (BER0). When the calculated BER is less than or equal to the maximum BER, the electronic device may monitor the BER of a radio signal received while repeatedly performing operation 721. When the calculated BER is greater than the maximum BER, in operation 725, the electronic device may change a charging method for battery charging to a second candidate charging method (e.g., quick charging method).

In operation 725, the electronic device may calculate the BER value of a radio signal received while charging the battery based on the second candidate charging method. In operation 729, the electronic device may determine whether the calculated BER is greater than the maximum BER (BER0). When the calculated BER is less than or equal to the maximum BER, the electronic device may monitor the BER of a radio signal received while repeatedly performing operation 727. When the calculated BER is greater than the maximum BER, in operation 731, the electronic device may change a charging method for battery charging to a third candidate charging method (e.g., quick charging method).

According to another embodiment, the electronic device may determine a value at which power for battery charging becomes the largest within a range in which the BER of a radio signal received does not exceed the maximum BER with respect to each of a plurality of charging methods. The electronic device may determine a maximum charging power for each charging method. The electronic device may charge the battery based on a charging method having the largest maximum charging power.

Figure 8:
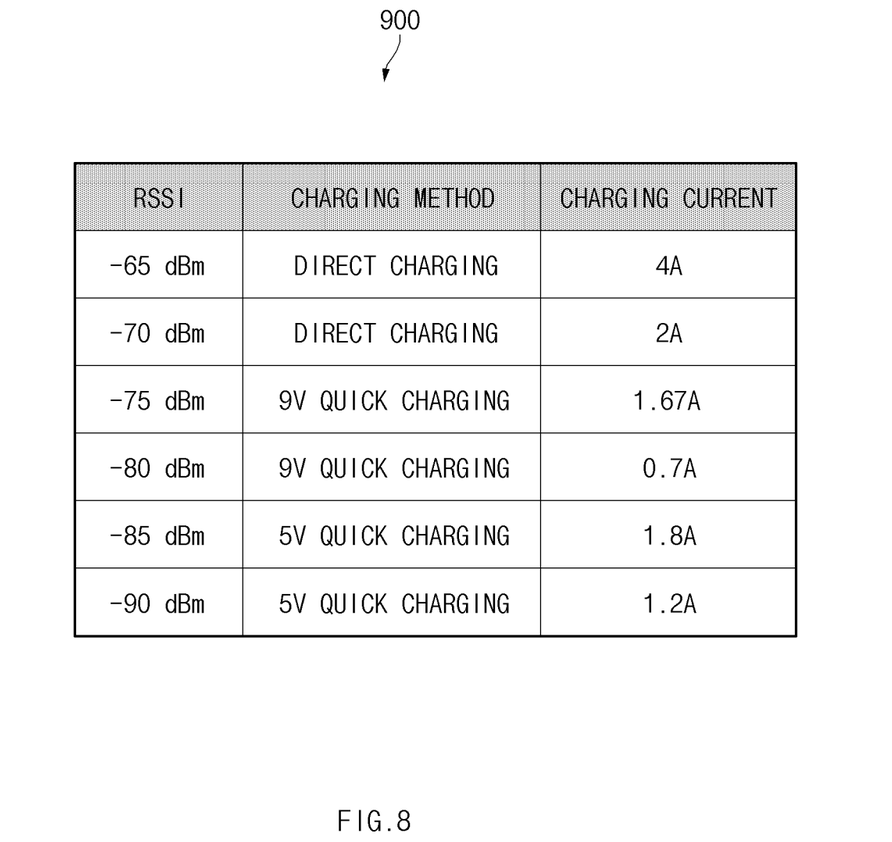
FIG. 8 illustrates an example of a look-up table used to determine a charging method in an electronic device, according to an embodiment.

FIG. 8 illustrates an example of a look-up table 900 used to determine a charging method in an electronic device, according to an embodiment.

According to an embodiment, an electronic device may determine a charging method using a look-up table in operation of determining a charging method (e.g., operation 540 of FIG. 5).

For example, the electronic device may determine a received signal strength value of a received radio signal, and search for a charging method and a charging current mapped to the determined received signal strength value in the look-up table.

The electronic device may charge the battery based on the charging method and the charging current found in the lookup table.

Figure 9:
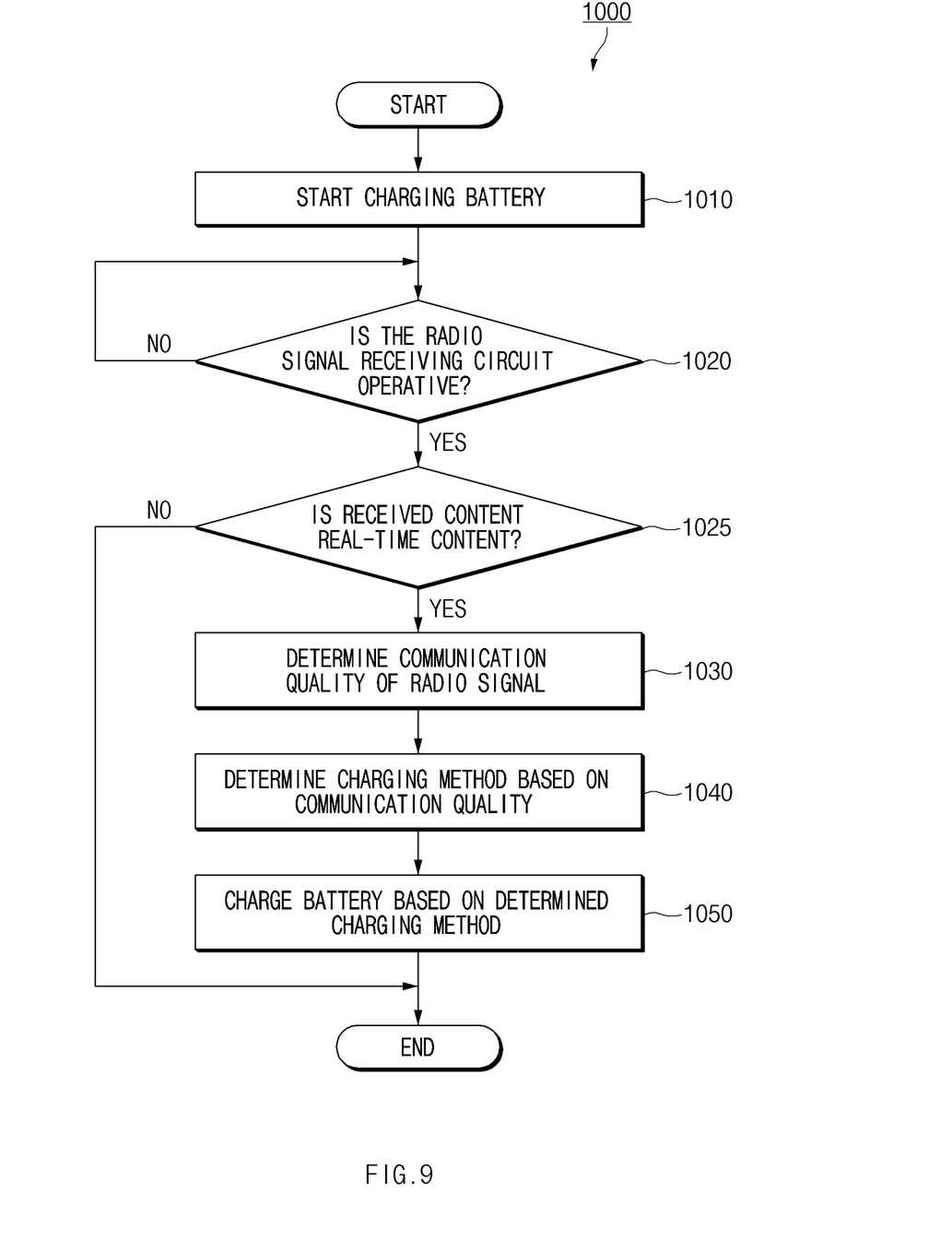
FIG. 9 is a flowchart of a process of determining a charging method in an electronic device according to an embodiment.

FIG. 9 is a flowchart 1000 of a process of determining a charging method in an electronic device (e.g., the electronic device 101 of FIG. 1) according to an embodiment.

In operation 1010, when charging power is supplied to an electronic device from an external charging device, the electronic device may start charging a battery. The electronic device according to an embodiment may identify a type of the external charging device and start charging the battery based on a charging method according to the type of the external charging device in operation 1010. For another example, the electronic device may identify the type of the external charging device based on a voltage and/or current supplied from the external charging device. However, embodiments are not limited thereto.

In operation 1020, the electronic device may determine whether the radio signal receiving circuit (e.g., the radio signal receiving circuit 310 of FIG. 3) operates while charging the battery. That is, the electronic device may determine whether an operation of receiving a radio signal is performed through the radio signal receiving circuit. When the radio signal receiving circuit does not operate, the electronic device may continuously charge the battery based on the charging method determined in operation 1010.

According to an embodiment, the electronic device may change whether to change a communication method based on content received through a radio signal. That is, when the radio signal receiving circuit operates while the battery is being charged, in operation 1025, the electronic device according to an embodiment may determine whether to determine a communication method based on a communication quality, according to the content received through the radio signal. For example, an electronic device may perform operation 1030 to operation 1050 for determining a charging method based on a communication quality because digital multimedia broadcasting (DMB) media includes video and audio media that is output in real time when received through the radio signal. In another example, when receiving non-real-time data, such as text or an electronic document through a radio signal, the electronic device may continuously charge the battery based on the charging method disclosed in operation 1010, as reception quality is not as important to reproduction of non-real-time data.

Determining whether to select a communication method based on a communication may be implemented in other embodiments. For example, the electronic device may determine whether to execute operation 1030 to 1050 based on the type of an application that receives and processes a radio signal (rather than the type of data). In another example, the electronic device may determine whether to perform operation 1030 to operation 1050 based on a format of data (rather than the type of data) received through a radio signal.

In operation 1030, the electronic device may determine a communication quality of the radio signal received through a radio signal receiving circuit. The communication quality may include at least one of a radio signal reception sensitivity or a received signal strength value. The radio signal reception sensitivity may include, for example, a bit error rate (BER). The received signal strength value may include at least one of, for example, a Received Signal Strength Value (RSSI), a Reference Signal Received Power (RSRP), a Reference Signal Received Quality (RSRQ), and a Signal to Interference plus Noise Ratio (SINR).

In operation 1040, the electronic device may determine a charging method to be applied for battery charging based on the determined communication quality. According to an embodiment, although the electronic device starts charging the battery based on a first charging method in operation 1010, the electronic device may switch a charging method for charging of the battery from the first charging method to a second charging method when the communication quality determined in operation 1030 is out of a specified range. The specified range may be a value stored in a memory (e.g., memory 130 of FIG. 1) of the electronic device as a condition (operation condition) for normal operation of the radio signal receiving circuit. For example, when the BER determined in operation 1030 is greater than a maximum BER stored in the electronic device, the electronic device may change the charging method for charging of the battery. In operation 1050, the electronic device may charge the battery using the determined charging method.

The electronic device according to certain embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that certain embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Certain embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to certain embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to certain embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to certain embodiments of the present disclosure may be executed sequentially, in parallel, repeatedly, or in a heuristic method. Also, at least some operations may be executed in different sequences, omitted, or other operations may be added.

According to the embodiments disclosed herein, it is possible to provide an electronic device and a method capable of reducing noise occurring in a communication signal during a process of charging a battery.

In addition, various effects may be provided that are directly or indirectly understood through the disclosure.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a radio signal receiving circuit configured to receive a radio signal;
a battery;
a charging circuit configured to charge the battery;
a memory; and
a processor communicatively connected to the radio signal receiving circuit, the charging circuit, and the memory,
wherein the memory stores instructions that, when executed, cause the processor to:
charge the battery in a first charging method through the charging circuit;
identify a communication quality of the radio signal received through the radio signal receiving circuit, while the charging circuit is charging the battery in the first charging method, wherein the communication quality includes a bit error rate (BER) as calculated for the radio signal;
determine whether the BER is greater than a specified value;
determine whether a content received through the radio signal is real-time content;
when the BER is greater than the specified value and the content is real-time content, charge the battery in a second charging method using a lower charging voltage than the first charging method through the charging circuit to reduce noise occurring in the radio signal; and
when the content is non-real-time content, maintain the first charging method.

2. The electronic device of claim 1, wherein the first charging method includes a direct charging method, and the second charging method includes a quick charging method.

3. The electronic device of claim 1, wherein the memory stores a look-up table mapping a plurality of communication qualities respective to a plurality of charging currents, and
wherein the processor configured to:
search the look-up table for the communication quality and charging current based on the identified communication quality.

4. The electronic device of claim 3, wherein the communication quality includes a Received Signal Strength Indicator (RSSI) for the radio signal.

5. The electronic device of claim 1, wherein the first charging method is one of a direct charging method, a quick charging method, and a normal charging method.

6. A method for charging a battery in an electronic device, comprising:
initiating charging of the battery in a first charging method using a charging circuit;
receiving, through a radio signal receiving circuit, a radio signal while the battery is being charged;
identifying a communication quality of the radio signal received through the radio signal receiving circuit, while the charging circuit is charging the battery in the first charging method, wherein the communication quality includes a bit error rate (BER) as calculated for the radio signal;
determining whether the BER is greater than a specified value;
determining whether a content received through the radio signal is real-time content;
when the BER is greater than the specified value and the content is real-time content, charging the battery in a second charging method using a lower charging voltage than the first charging method through the charging circuit to reduce noise occurring in the radio signal; and when the content is non-real-time content, maintaining the first charging method.

7. The method of claim 6, wherein the first charging method includes a direct charging method, and the second charging method includes a quick charging method.

8. The method of claim 6, further comprising:
storing in a memory a look-up table, the look-up table mapping a plurality of communication qualities respective to a plurality of charging currents,
wherein selecting a charging method and setting a charging current includes searching the look-up table using the identified communication quality.

9. The method of claim 6, wherein the communication quality includes a Received Signal Strength Indicator (RSSI) for the radio signal.

10. The method of claim 6, wherein the first charging method is one of a direct charging method, a quick charging method and a normal charging method.

* * * * *